United States Patent [19]

Bodnar

[11] 4,152,700
[45] May 1, 1979

[54] RADAR EXTRACTOR HAVING MEANS FOR ESTIMATING TARGET LOCATION WITH A RANGE CELL

[75] Inventor: Andrew R. Bodnar, Millersville, Md.

[73] Assignee: Westinghouse Electric Corp., Pittsburgh, Pa.

[21] Appl. No.: 662,788

[22] Filed: Mar. 1, 1976

[51] Int. Cl.² ............................................... G01S 9/16
[52] U.S. Cl. .................................. 343/5 VQ; 343/7.3; 343/13 R
[58] Field of Search .................... 343/5 VQ, 7.3, 13 R

[56] References Cited

U.S. PATENT DOCUMENTS 3,718,927  2/1973  Howard et al. ..................... 343/7.4

Primary Examiner—Malcolm F. Hubler
Attorney, Agent, or Firm—H. W. Patterson

[57] ABSTRACT

A target extractor for radar systems which accurately determines the radial position of the target within the range cell containing the target. The azimuth of the target is determined by conventional extractor systems. An incremental target range is located with respect to a primary range cell boundary. The primary range cell is selected as the range cell which contains the maximum number of reflected transmitter pulses. The number of reflected transmitter pulses received in secondary range cells located radially below and radially above the primary range cell is determined by the target extractor. The target extractor also determines the ratio of the pulses detected in the secondary range cells which are located radially on each side of the primary range cell. The location of the target defined within the radial dimension of the primary range cell is determined by interpolation circuitry in the target extractor. The interpolation circuitry shifts the effective location of its output signal by an amount which is proportional to the determined ratio of the pulses in the secondary range cells.

9 Claims, 7 Drawing Figures

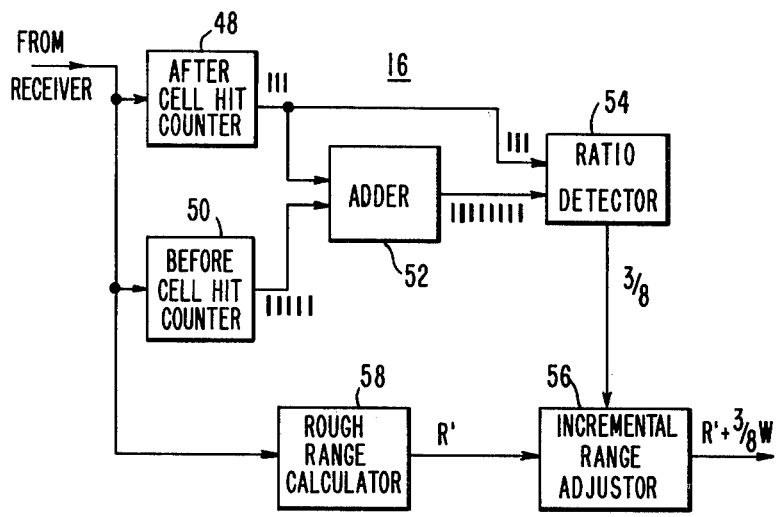
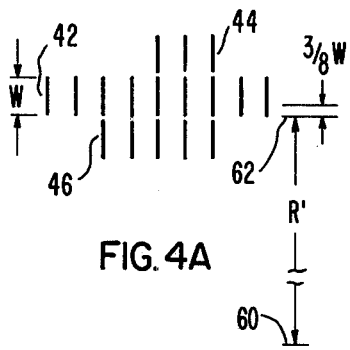
FIG.4
FIG.4A
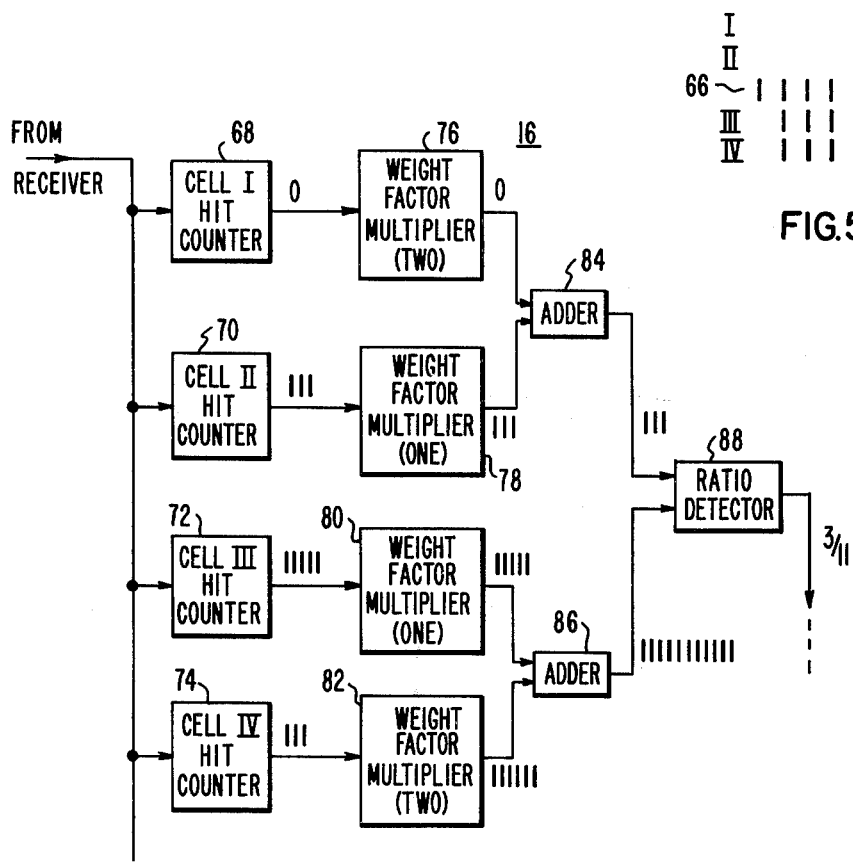
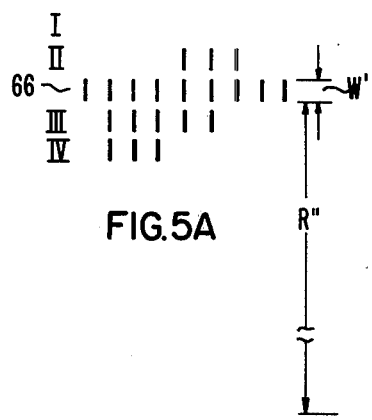
FIG.5
FIG.5A

4,152,700

RADAR EXTRACTOR HAVING MEANS FOR ESTIMATING TARGET LOCATION WITH A RANGE CELL

BACKGROUND OF THE INVENTION

1. Field of the Invention

This invention relates, in general, to radar systems and, more specifically, to radar target extractors.

2. Description of the Prior Art

Target extractors for radar systems include signal processing circuitry which determines various information about the location and projected location of a target illuminated by the radar system transmitter. Electronic target extractors are often used in conjunction with a visual display which indicates the pulses reflected by the target. However, with modern weapon systems, the visual display, if used, rarely is sufficient to determine the needed information accurately and quickly enough. Therefore, an electronic target extractor is normally used to ascertain the information needed about the location, direction, speed, etc. of the target.

In a typical monostatic radar system where the illuminating transmitter and the reflected signal receiver are located at substantially the same position, a Plan Position Indicator (PPI) is generally used. With such an indicator system it is necessary to determine the distance or range to the target from the radar antenna and the direction or azimuth from the radar antenna to the target. While measuring distances and plotting angles on a conventional PPI display screen would roughly give the information needed, the lack of accuracy and the time required could not be tolerated with modern weapon and counter weapon systems. Therefore, efforts have been made in the prior art to "extract" or process electronically the radar signals to achieve a workable system for determining the desired information about the target.

The fact that radar transmissions consist basically of transmitted pulses gives the reflected signal at the radar receiver the characteristics of a pulse signal. When a pulse received by the radar system exceeds a predetermined threshold value, a "hit" is detected by the target extractor. To reduce the effect of extraneous noise pulses, a target is declared only when several close hits are detected by the target extractor. The occurrence of these hits is synchronized to the antenna orientation to provide the azimuth of the hit and are related to the total propogation time of the radar signal to provide the distance or range to the source causing the reflected hit signal.

Due to the multiplicity of hits detected by the target extractor and also to the filtering and sampling circuitry of the radar receiver system, and to the finite antenna beam width, hits are always produced at more than one specific azimuth and range location. Consequently, the extractor must be able to determine a specific azimuth and range location from a field of hits. According to prior art techniques, the azimuth of the target is determined as the angle to the location of the radial hit region or range cell which contains the greatest number of hits. The hits in this "primary" range cell are processed according to other prior art techniques to determine the azimuth of the target.

Two examples of azimuth determining circuitry arrangements frequently used are known by those skilled in the radar art as up-down counter detectors and as sliding window detectors. An up-down counter detector is described in U.S. Pat. No. 3,359,442, issued on Dec. 19, 1967. U.S. Pat. No. 3,646,588, issued on Feb. 29, 1972 describes apparatus for predicting and correcting radar data by "logically processing" a group of bits which correspond to video signals detected by the radar receiver.

Since the overall performance of a radar system is based to a large extent upon the accuracy of the target location provided by the radar extractor, it is important that the accuracy of a radar system be as great as possible consistent with system reliability and economy. Therefore, it is desirable, and it is an object of this invention, to provide a radar target extractor having improved range accuracy over prior art techniques and being compatible with existing azimuth extracting techniques.

SUMMARY OF THE INVENTION

There is disclosed herein a new and useful arrangement for determining accurately the range of a target detected by a monostatic radar system. The target is first determined to be located within the boundaries of a primary range cell. Secondary range cells located on opposite sides of the primary range cell are then observed by the target extractor of the radar system to determine in what portion of the primary range cell the target is located.

The distance to a fixed or reference location in the primary range cell is determined by conventional circuitry in the radar target extractor. Also, the number of radar returns or hits in each of the secondary range cells is determined by suitable counters. The distance to the reference location of the primary range cell is modified by an amount which is responsive to the ratio of the counted hits in the secondary range cells located on both sides of the primary range cell.

In one specific embodiment, the reference location for the primary range cell is the location of the inner boundary thereof. The adjusted range of the target is equal to the distance to this reference location plus a distance proportional to the ratio of hits in the secondary range cells located on opposite sides of the primary range cell. In another embodiment, more than two secondary range cells are used to effectively interpolate the radial dimension of the primary range cell to determine the incremental distance which is added to the distance to the reference location of the primary range cell. In still another specific embodiment of the invention, circuitry is used which weights the hits in certain range cells according to the location of the secondary range cell.

BRIEF DESCRIPTION OF THE DRAWING

Further advantages and uses of this invention will become more apparent when considered in view of the following detailed description and drawing, in which:

FIG. 4 is a block diagram illustrating a radar target extractor constructed according to one specific embodiment of this invention;

FIG. 4A is a linear representation of a radar return signal which may be processed by the circuitry shown in FIG. 4;

FIG. 5 is a block diagram illustrating a radar target extractor constructed according to another specific embodiment of this invention; and FIG. 5A is a linear representation of a radar return signal which may be processed by the circuitry shown in FIG. 5.

DESCRIPTION OF THE PREFERRED EMBODIMENTS

Figure 1:
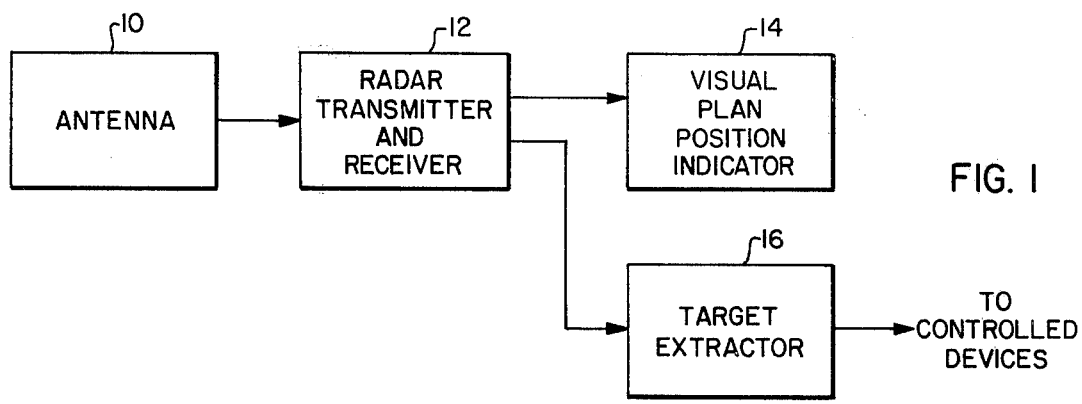
FIG. 1 is a simplified block diagram of a radar system having a target extractor.

Throughout the following description, similar reference characters refer to similar elements or arrangements in all of the figures of the drawing.

Referring now to the drawing, and to FIG. 1 in particular, there is shown a simplified block diagram of a conventional radar system utilizing a target extractor. The radar system includes an antenna 10, suitable transmitter and receiver elements 12, and a visual Plan Position Indicator (PPI) 14. The radar system also includes a target extractor 16 which receives information from the radar receiver 12 and processes this information to provide the appropriate signals or information to the controlled devices, such as a weapon guidance system. The target extractor 16 provides information about the azimuth and range of the detected target which is more accurate than that which can be determined from the visual Plan Position Indicator 14. The target extractor 16 also provides such information much faster than could be obtained by plotting techniques with the Plan Position Indicator 14.

Figure 2:
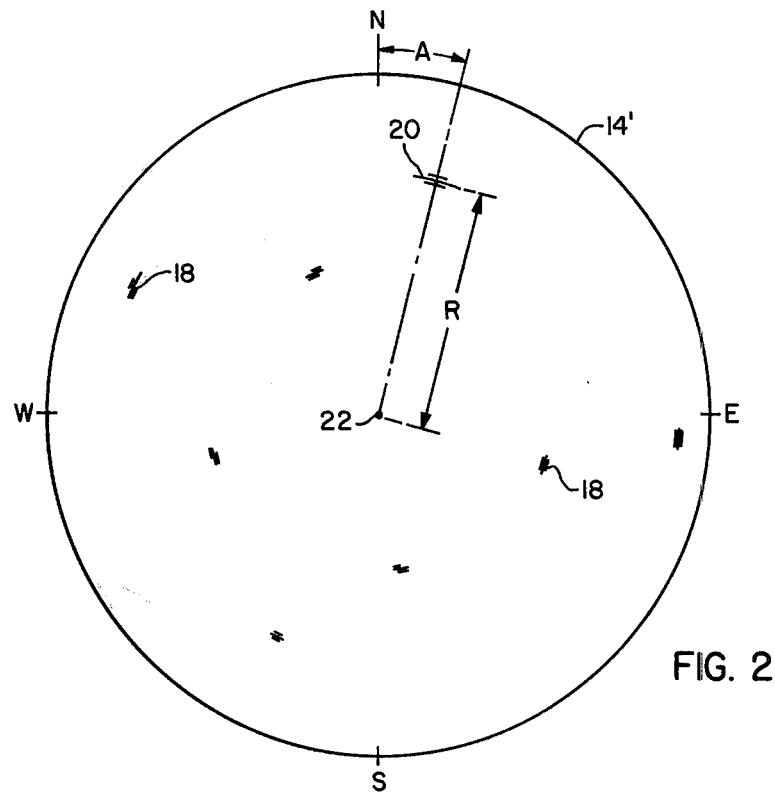
FIG. 2 is a simplified view of a visual plan position indicator of the type which may be used in the radar system of FIG. 1.

FIG. 2 is a general view of a Plan Position Indicator 14' illustrating the relationship between a target's azimuth and range and the typical pattern of a return signal from a radar target. Small clusters or groups of return signals, such as the return signals 18, may appear on the Plan Position Indicator 14' due to reflections from other targets in the radar's area of coverage. Other return signals can also be caused by noise created in the radar system or in the area across which the radar system sweeps.

According to conventional techniques widely known by those skilled in the art, when a radar return signal exceeds a predetermined magnitude or energy level for a sufficient number of pulses, the determination is made that the return signal is being reflected by an object regarded as a target. Such a return signal display is represented by the return signal 20 shown in FIG. 2. This return signal represents the reflection of radio energy from the target which is illuminated by the radar transmitter. The azimuth A of the target represented by the return signal 20 is the angle formed by lines extending from the radar antenna location 22 to the return signal 20 and to a fixed reference point, with the North compass direction being the reference point in the display shown in FIG. 2.

The range or distance to the target is determined by the amount of time required for the radar signal to move from the antenna location 22 to the target location and back to the antenna location 22. The range R is indicated in FIG. 2 as that distance between the return signal 20 and the antenna location 22. Since the return signal 20 from the target is not a single point, that is, a spread or group of return signals in both the radial and tangential directions is detected by the radar system, the exact location of the target is not readily obtainable from the return signals displayed on a Plan Position Indicator. For this reason, and in the interest of determining a more accurate location of the target in a shorter amount of time, a target extractor is usually used with such radar systems to electronically process the return signals from the radar target.

Figure 3:
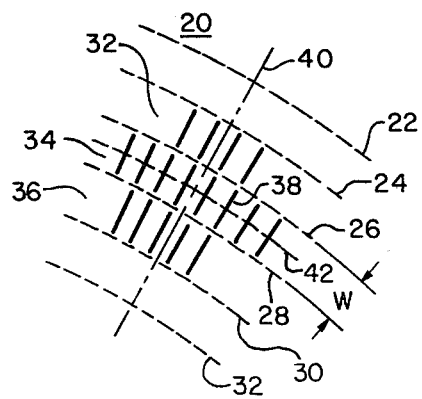
FIG. 3 is an enlarged view of a return signal displayed on the indicator in FIG. 2.

FIG. 3 is an enlarged view of the return signal 20 illustrated in FIG. 2. As can be seen from FIG. 3, the displayed signal consists of a group of pulses on the Plan Position Indicator. The spacing of the return signals is determined by many factors, including the time duration (pulse width) of the transmitted signal from the radar transmitter and the size of the range cell. The pulses are contained within range cells which are defined by boundaries, such as the boundaries 22, 24, 26, 28, 30 and 32 as shown in FIG. 3. The boundary containing the greatest number of radar return pulses is regarded as the primary range cell since it is within this range cell that the target is located. Consequently, the range cell 34 shown in FIG. 3 is the primary range cell for the return signal 20 since range cell 34 contains more reflected pulses than any other range cell in the return signal display. The pulses on the opposite sides of the range cell 34 are contained within the range cells 32 and 36 which are secondary range cells since the pulses contained therein are produced due to the finite antenna beam width used with the radar system, the receiver filtering circuitry, the receiver sampling rate, and other factors concerning the construction of the radar system.

When a sufficient number of return pulses, which are illustrated in FIG. 3 by lines such as by the line 38, are present in any particular range cell, the target extractor determines that a target has been detected and it is then necessary to determine the azimuth and range of the target. The azimuth of the target can be determined by several prior art techniques widely known by those skilled in the art, such as by using up-down counter detector and sliding window detector techniques. Generally, both methods take into account the number of pulses received in the primary range cell and provide an azimuth reading which is approximately located in the center of the pulse region. By way of an example, the line 40 shown in FIG. 3 may be used as the reference line for calculating the azimuth of the target since the line 40 divides the pulses in the primary range cell 34 into pulse segments containing an equal number of pulses.

The range of the target is determined by the location of the primary range cell 34 with respect to the radar antenna location. The primary range cell 34 has a finite radial dimension or width W which the radar system effectively sees due to the antenna beam width of the radar system and to other factors of the radar system. Therefore, the range or radial distance to the target cannot be accurately pinpointed to the exact location within the range cell 34. Consequently, conventional radar systems have used a predetermined reference value for any particular range cell in the radar system which contains the target return signals. For example, the line 42 which represents the midpoint of the primary range cell 34 may be used to measure the range between the antenna location and the radar target since the line 42 is in the middle of the primary range cell 34. This would provide an accurate estimation of the exact location of the target when no other means to determine the position of the target within the radial dimension W is used. The present invention effectively uses the information contained in the secondary range cells 32 and 36 to determine in which portion of the primary range cell the target is located.

FIG. 4 is a block diagram of a target extractor constructed according to this invention which utilizes information contained within the secondary range cells on both sides of the primary range cell of a radar target return signal. FIG. 4A is an enlarged view of a typical radar return signal display from a Plan Position Indicator. FIG. 4A will be used in the description of the circuitry shown in FIG. 4. In FIG. 4A, the primary range cell 42 has a radial dimension W and is located between the secondary range cell 44 and the secondary range cell 46. The secondary range cell 46 is arbitrarily referred to as the "before" range cell and the secondary range cell 44 is arbitrarily referred to as the "after" range cell, being somewhat descriptive of the location of the particular secondary range cell with respect to the time the radar signal hits the secondary range cell in regard to the time the radar signal hits the target in the primary range cell 42.

Referring again to FIG. 4, the information from the radar system receiver is applied to the target extractor shown in FIG. 4 and the "after" cell hit counter 48 counts the number of pulses or hits contained in the "after" range cell 44 shown in FIG. 4A. As is done in other portions of the block diagram of FIG. 4, these pulses are illustrated along the lines connecting the boxes of the diagram together. The "before" cell hit counter 50 counts the number of hits or pulses contained in the secondary range cell 46. After the before and after range cells are counted for the number of hits therein, the result is applied to an adder 52 which, in the example shown, produces an output having a count of eight hits. This output of the adder 52 is applied to the ratio detector 54 along with the output of the counter 48. The resulting ratio 3/8 is applied to the incremental range adjuster 56.

The radar system is also connected to the rough range calculator 58 which determines the range of a reference point corresponding to the primary range cell 42. This can be done by conventional circuitry which is widely used to correlate the propogation time of the radar signal between the radar antenna and the radar target. In FIG. 4A, the rough range R' is the distance between the radar antenna location 60 and the reference line 62. Although other locations of the reference line 62 may be used, the beginning edge or boundary of the primary range cell 42 is used for the illustration herein.

Since the ratio detector 54 has determined the ratio of the number of hits in the secondary range cells 44 and 46, this information can be used to determine the approximate location of the target within the primary range cell 42 which has a width dimension W. Thus, the resolution of the radar system construction according to this invention is more accurate than the resolution of conventional systems wherein the range calculator is only able to determine ranges in increments equal to the width of a primary range cell.

In FIG. 4, the rough range calculator output is applied to the incremental range adjuster 56 along with the output of the ratio detector 54. As illustrated in FIG. 4A the adjusted range to the radar target is equal to the rough range R' plus the product of the output of the ratio detector and the width W of the primary range cell. In the example shown, the adjusted range to the radar target is equal to the rough range plus the incremental range within the primary range cell. This incremental range is, in the example illustrated, 3/8 of the total distance W between the radial extremities of the primary range cell 42. This interpolation arrangement provides an adjusted range which is located within the primary range cell in proportion to the number of hits located in the secondary range cells on both sides of the primary range cell. In other words, since more hits were recorded in the "before" secondary range cell 46 than in the "after" secondary range cell 44, it is evident that the radar target is located closer to the reference line 62 than to the boundary of the primary range cell 42 located between the primary range cell 42 and the secondary range cell 44.

By using this technique, the accuracy of the radar system range determination may be improved by determining the location of the radar target within the boundaries of the primary range cell 42. Since the system described herein is independent of the azimuth determining circuitry, any of the arrangements known in the prior art to more accurately estimate the azimuth of the target may be used with this arrangement.

The radar display shown in FIG. 4A contains radar hit pulses only in secondary range cells located directly adjacent to the primary range cell 42. However, in many cases, the radar display will contain hits in other secondary range cells which are on each side of the primary range cell. For example, some radar hits may be produced in the range cell located radially above the secondary range cell 44 shown in FIG. 4A. When the radar response is such that radar hits are indicated in more secondary range cells than that shown in FIG. 4A, the target extractor may be modified to take into account the hits in these secondary range cells in determining the location of the target within the primary range cell. However, depending upon the complexity and accuracy of the system, it may be, and it is within the scope of this invention, that only the two range cells immediately on opposite sides of the primary range cell will be needed to interpolate the incremental range distance within the primary range cell.

FIG. 5 is a block diagram of another embodiment of this invention wherein the target extractor 16 is designed to take into account radar hits in more than two secondary range cells. FIG. 5A is a typical radar display and will be used in describing the operation of the circuit shown in block form in FIG. 5. In FIG. 5A, the primary range cell 66 has a range dimension W'. The secondary range cells I, II, III and IV are located on opposite sides of the primary range cell 66 as illustrated in FIG. 5A. The secondary range cell I does not contain any radar hits according to the display shown in FIG. 5A.

Signals corresponding to the radar hits from the radar receiver are applied to the cell hit counters 68, 70, 72 and 74 as shown in FIG. 5. Assuming the radar pattern illustrated in FIG. 5A, the output of the cell hit counter 68 indicates zero number of counts since there are not any radar hits located within the secondary range cell I. By observation of FIG. 5A, it can be seen that the output of the cell II hit counter 70 will contain three pulses, the output of the counter 72 will contain five pulses, and the output of the counter 74 will contain three pulses.

It is emphasized that, although the outputs of the counters 68, 70, 72 and 74 are referred to as containing a certain number of hits or pulses, it should be apparent that the output may be an analog or digital voltage corresponding to these numbers of hits. The exact form of the output of a hit counter depends upon the type of electronic circuitry used.

Although not necessary for all types of radar systems, a weight factor may be desirable to modify the number of hits in secondary range cells located in different radial positions from the primary range cell. This will have the effect of weighting the number of pulses in a particular secondary range cell according to the location of the secondary range cell. For example, as shown in FIG. 5, any radar hits contained within secondary range cell I would be multiplied by a factor of two and would, after suitable processing, have twice the effect on the derived ratio as pulses or hits contained in secondary range cells II and III. Thus, the weight factor multiplier 76 has a multiplying factor of two and the weight factor multiplier 78 has a multiplying factor equal to one. Similar multiplying factors are used for the weight factor multipliers 80 and 82. It is within the contemplation of this invention that other weight factor multiplying numbers may be used or, if desired, the hits in all of the secondary range cells may be given the same weight, thereby effectively providing weight factor multipliers with a multiplication factor of one for each secondary range cell.

After the outputs of the hit counters 68, 70, 72 and 74 are multiplied by the appropriate weight factor, they are applied to the adders 84 and 86. As can be seen from the pulses illustrated along the lines which connect the blocks of the diagram shown in FIG. 5, the output of the adder 84 will correspond to three hits and the output of the adder 86 will correspond to eleven hits. When these outputs are applied to the ratio detector 88, an output ratio 3/11 is produced. The output ratio is applied to an incremental range adjustor, which is not shown in FIG. 5, to determine the adjusted range location of the target. In relation to FIG. 5A, the rough range of the target would be equal to R" and the adjusted range to the target with the weight factors used in FIG. 5 would be equal to the rough range R" plus 3/11 of the primary range cell dimension W'.

The radar target extractor described herein provides means for determining the location of a target within the dimensions of a primary range cell. The apparatus described herein is compatible with conventional azimuth determining circuitry, thereby providing means for accurately determining the location of a target within the radar area. Also, since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A radar target extractor for determining the range of a target within a primary range cell having a predetermined radial dimension, comprising:
   means for determining a reference location for the primary range cell containing the radar target;
   means for determining the number of radar hits within at least a first range cell located radially before the primary range cell;
   means for determining the number of radar hits within at least a second range cell located radially after the primary range cell; and
   means for combining the determined number of hits in the first and second range cells, said reference location, and the radial dimension of the primary range cell to adjust the range of the target within the primary range cell.

2. The radar target extractor of claim 1 wherein the combining means includes means for processing the number of hits in the first and second range cells to provide a quantity proportional to the ratio of the number of hits in the first and second range cells.

3. The radar target extractor of claim 2 wherein the combining means includes means for adjusting the reference location of the primary range cell by an amount proportional to said ratio.

4. The radar target extractor of claim 3 wherein the reference location of the primary range cell corresponds to the range of the inner boundary of the primary range cell.

5. The radar target extractor of claim 4 wherein the combining means includes means for adding said reference location of the primary range cell to a distance equal to said hit ratio multiplied by the radial dimension of the primary range cell.

6. A radar target extractor for determining the range of a target, comprising:
   means for determining a reference location for a primary range cell containing the radar target;
   means for detecting the number of radar hits within a first range cell which is located radially before the primary range cell;
   means for detecting the number of radar hits within a second range cell which is located radially before the first range cell;
   means for detecting the number of radar hits within a third range cell which is located radially after the primary range cell;
   means for detecting the number of radar hits within a fourth range cell which is located radially after the third range cell;
   means for combining the number of hits in the first and second range cells to provide a first number which corresponds to the hits in said first and second range cells;
   means for combining the number of hits in the third and fourth range cells to provide a second number which correspond to the hits in said third and fourth range cells;
   means for determining the ratio of the first and second numbers; and
   means for adjusting the reference location of the primary range cell by an amount which is responsive to the ratio of the first and second numbers.

7. The radar target extractor of claim 6 wherein the first combining means equally adds the number of hits in the first and second range cells to provide said first number, and wherein the second combining means equally adds the number of hits in the third and fourth range cells to provide said second number.

8. The radar target extractor of claim 6 wherein the first and second combining means include circuitry which weights the number of hits in the first range cell compared to those in the second range cell and the number of hits in the fourth range cell compared to those in the third range cell.

9. The radar target extractor of claim 8 wherein the circuitry applies a weight factor of one to the hits in the second and third range cells and a weight factor of two to the hits in the first and fourth range cells.

* * * * *